Aug. 10, 1965   KARL-HEINZ OEHLRICH ETAL   3,199,272
PARTICLE-FROM-GAS SEPARATORS
Filed Oct. 31, 1961   3 Sheets-Sheet 2

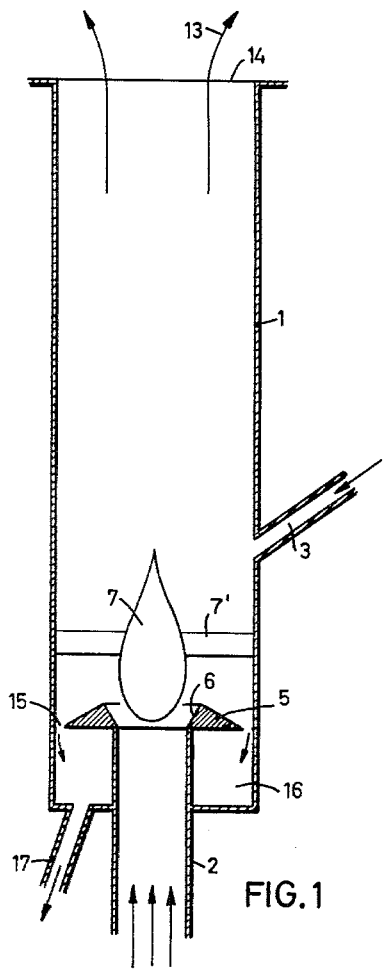
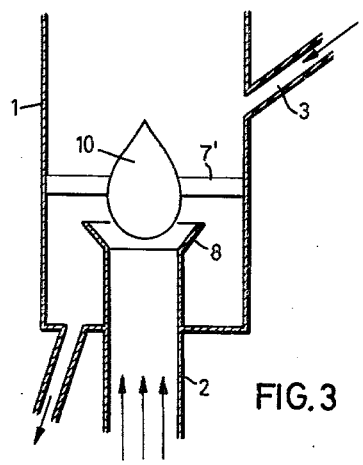
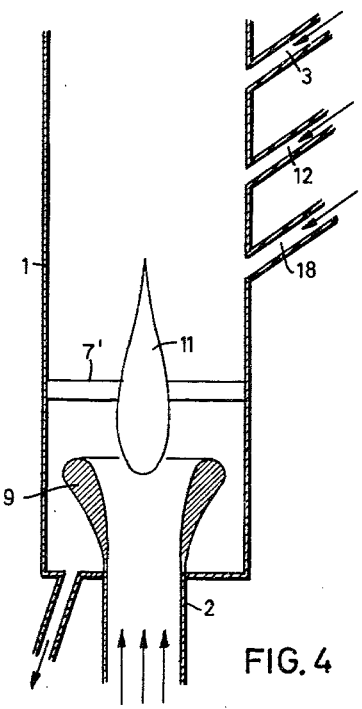
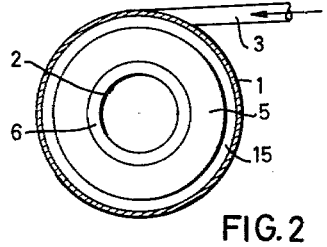

3,199,272
PARTICLE-FROM-GAS SEPARATORS
Karl-Heinz Oehlrich, Erwin Schauffler, and Karl-Rudolf
Schmidt, Erlangen, Germany, and Hans Zenneck, deceased, late of Erlangen, Germany, by Sofie Zenneck, sole heir, Erlangen, Germany, assignors to Siemens-Schuckertwerke Aktiengesellschaft, Berlin-Siemensstadt, Germany, a corporation of Germany
Filed Oct. 31, 1961, Ser. No. 149,127
11 Claims. (Cl. 55—261)

Our invention relates to particle-from-gas separators, applicable for dust-removing or drying purposes, and in a more particular aspect to separators designed and operating on a principle that involves so-called "relative forces" that occur in flowing media subjected to a rotational flow having a potential-flow component and a circulatory-flow component and resulting in vortex source and sink formation within the separator vessel. The physical principles of this type separation and the forces resulting from the just-mentioned flow phenomena are explained in the copending applications Serial No. 835,886, filed August 25, 1959; Serial No. 24,391, filed April 25, 1960; and Serial No. 128,431, filed August 1, 1961, these applications being assigned to the assignee of the present invention.

According to the prior disclosures identified above, a separation of solid or liquid particles from gas can be effected by passing the gas flow through a cylindrical whirling chamber to which the particle-laden gas is supplied at one end and which also receives, through one or more lateral nozzles, an auxiliary flow of air joining the main gas flow in a generally tangential direction and at an acute angle to the axis of the main flow and in opposition to that flow so as to excite in the main flow the above-mentioned rotational motion having potential-flow and circulatory-flow components. The occurring flow phenomena impose a strong separating force upon any dust or liquid particles entrained in the gas flow, and these particles collect in a rotating ring (dust ring) from which they can be readily discharged. The separating action thus differs from that of a centrifugal device, such as a conventional cyclone, in that the separation is not only by centrifugal force but is also due to additional effects explainable by superimposed "velocity fields" or, to employ the terminology of the above-mentioned prior applications, by the occurrence of "relative forces" due to the simultaneous presence of a potential flow and a circulatory flow in different but adjacent zones of the separator chamber.

It is an object of our invention to devise a separator on the above-mentioned principles which is of a particularly simple and economical design and which lends itself more readily than those heretofore proposed to being built into, or used together with, various gas conduits such as flue ducts or other gas-duct lines, industrial drying or dust-removing equipment and similar installations.

Another object of our invention is to improve the efficacy of dust or particle separation within a relatively small space as well as the stability and reliability of particle-separating performance.

To achieve these objects, and in accordance with one of the features of our invention, we provide a particle-from-gas separator with a cylindrical, axially elongated enclosure, preferably mounted vertically when in operation with the inlet for particle-laden gas being located at the bottom of the enclosure and the outlet for clean gas at the top. Preferably the outlet is simply formed by the straight top end of the vertical cylindrical enclosure structure so that the entire structure essentially constitutes a tubular conduit that may be used directly for discharging the clean gas into a flue, chimney or the ambient air, or that may be inserted as a component into a duct line with the top of the enclosure forming the connecting end of the separator. This cylindrical enclosure is provided with one or more tangential and inclined lateral nozzles or pipes for injecting the above-mentioned auxiliary gas flow, the injection being downward, or generally against the main flow direction. It is one of the essential points of the invention that in such a separation structure the inlet for the particle-laden gas consists of a tubular duct structure which protrudes from below into the interior of the cylindrical enclosure a sufficient distance to form at the bottom of the cylindrical enclosure an annular collecting or receiving space for the separated particles (hereinafter referred to as "dust," although the same design is applicable also for separation of liquid particles). The dust-discharge pipe of the separator, therefore, is simply joined with the annular receiver space at the bottom of the cylindrical enclosure. We further provide the upper terminating portion of the gas inlet duct within the cylindrical enclosure with a funnel-shaped opening which widens upwardly, and we preferably give the funnel-shaped top portion of the gas inlet duct a streamlined (air-foil) cross section which bulges upwardly and tapers downwardly. The funnel-shaped top end of the gas inlet and the cylindrical wall of the enclosure jointly form an interstitial, narrow annular gap through which the separated dust can drain into the radially wider, annular receiver space.

By giving the funnel-shaped top portion of the gas inlet duct the above-mentioned streamlined cross section, this portion assumes generally a tulip-shaped configuration. In conjunction with such a design it is further of advantage to provide the separator with a flow-guiding body of streamlined, tear-drop shaped (called "dobbas"). This drop-shaped body has a rounded bulge at its lower end located at about the height of the funnel top or slightly below this height, whereas the upper end of the drop-shaped insert is substantially pointed and terminates at the lowermost height of the lateral nozzle means for supplying the auxiliary flow of gas.

According to further features of our invention, a multiplicity of injection pipes or nozzles are provided for supplying the auxiliary flow of gas, and these nozzle means are so directed that the injected gas flow travels closely along the inner cylindrical wall of the separator, the nozzle orifices being arranged either on one or more helical lines along the cylindrical enclosure or peripherally distributed on one or more planes substantially perpendicular to the axis of the separator enclosure. Some of the gas inlets may also be distributed along a helical line, whereas another number of the inlets are located on a common plane. As a rule, the nozzle orifices may be given a round cross-sectional shape. However, according to still another feature of our invention, the nozzles orifices have the shape of a slot to minimize undesired spreading of the injected gas flow from the most favorable inclined, tangential direction. Several nozzles can be grouped together to be supplied with auxiliary gas from a common duct or manifold. The nozzles may also be provided with means for producing turbulence in the flow of the auxiliary gas. For this purpose the inner surface of the nozzles may be roughened or provided with protuberances.

Wherever desired, some or all of the gas inlet nozzles can be made adjustable with respect to their inclined tangential position in several respective planes; and some or all of the nozzles can also be made adjustable with respect to the width of their orifices, their opening angle or the amount of auxiliary gas issuing therefrom. Often, however, it suffices to simply apply a variable or regulated pressure to the auxiliary gas being supplied to the injection nozzles.

It is further of advantage to mount the injection pipes or nozzles on the wall of the separator in such a manner that the nozzle orifices do not essentially protrude into the interior of the whirling chamber. The nozzle means and their orifice portions are preferably so arranged that these orifices are flush with the inner cylindrical wall of the separator enclosure. This virtually prevents the nozzle structures from impairing the desired formation of the rotational flow closely along the inner wall of the whirling chamber.

According to a further feature of our invention, the separating phenomena are stabilized and the circulating flow in the separator can be better adapted to the particular operating requirements to be met, by providing a constriction in the upper portion of the whirling chamber above the auxiliary-gas supply means. The constriction is preferably constituted by a planar, inclined or contoured ring structure or diaphragm. Such a constriction between the uppermost injection point of auxiliary gas and the outlet of the separator has the effect of deflecting any error jet from the injection point in the downward direction and also increases the pressure in the potential flow that takes place near the cylindrical separator wall. The ring structure is preferably fastened to the wall of the enclosure. In some cases it is desirable to provide another streamlined, drop-shaped body (dobbas) partly within or above the constriction.

The invention will be further described with reference to the embodiments of dust separators according to the invention illustrated by way of example on the accompanying drawings in which:

FIG. 1 shows schematically a vertical sectional view of a first embodiment and FIG. 2 a corresponding top view.

FIGS. 3 and 4 are vertical sectional views of two modified separators.

The same reference numerals are used in all illustrations for denoting corresponding components respectively.

Figure 5:
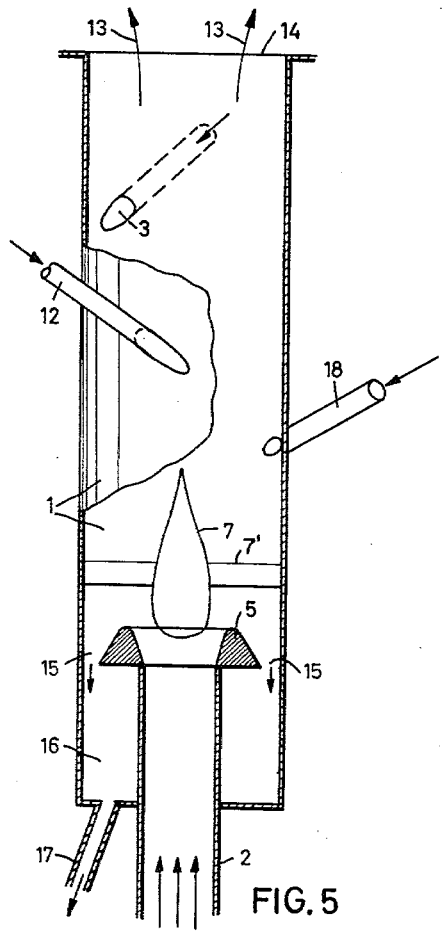
FIG. 5 is a partly sectional front view of another separator.

The separator according to FIGS. 1 and 2 comprises a cylindrical tubular enclosure 1 of sheet metal which, as shown, is preferably mounted in vertical position to serve as a chimney or flue conduit, although the elongated cylindrical enclosure may also be mounted in inclined or horizontal position. The interior of the tubular enclosure 1 constitutes the whirling chamber for separation of dust from smoke gas. The dust-laden raw gas is supplied through a cylindrical duct 2 which extends in coaxial relation to the tubular enclosure 1 and enters from below into the enclosure so that the upper portion of the inlet duct 2 protrudes into the enclosure. At some distance above the opening of the duct 2, the enclosure 1 is provided with a lateral nozzle pipe 3 whose direction is substantially tangential to the enclosure 1 and inclined downwardly so that when auxiliary gas is supplied through pipe 3, the flow of this gas has a component opposed to the upward direction of the main flow entering through the inlet duct 2. The gas supplied through nozzle pipe 3 may be air or any other suitable auxiliary gas. For example, the auxiliary gas may simply be a branched-off portion of the raw gas entering through duct 2. When raw gas is passing through inlet duct 2 into the enclosure 1 and auxiliary gas is simultaneously being injected through pipe 3, the cleaned gas, together with the auxiliary gas, passes through the outlet opening 14 at the top of the enclosure 1, this being indicated by arrows 13. The separated dust particles pass through a narrow annular gap 15 into a wider collector or receiver space 16 at the bottom of the enclosure 1 from which they are discharged through a dust-discharge pipe 17. With a vertical mounting of the enclosure 1 the discharge may be by gravity only.

As shown in FIG. 1, the inlet duct 2 within the enclosure 1 is provided with a funnel-shaped top portion 6 that widens upwardly. The funnel is formed by a ring-shaped body 5 whose outer diameter is only slightly smaller than the inner diameter of the tubular enclosure 1 in order to leave the narrow interstitial gap 15 mentioned above. In this manner, a good partitioning of the whirling and separating chamber in the upper space of the separator from the receiver space 16 is secured, while still promoting a good drainage of the separated particles into the receiver space 16 where these particles are no longer subjected to appreciable whirling action.

Mounted above the funnel-shaped top portion 5 of the gas inlet pipe 2 is the above-mentioned streamlined body (dobbas) 7 by means of a conventional support bar or bracket 7'. Such a body is not always needed but improves the flow condition and hence the reliability of separation in many cases. The lower, bulging end of the body is located at the height of the funnel top, or as shown, somewhat below this height, whereas the upper, pointed end of the body 7 is approximately at the height of the nozzle orifice. In this manner, the length of the axially mounted flow-guiding body 7 is well adapted to the fluid-flow velocities obtaining during operation. When the separator is provided with more than one nozzle or pipe for the supply of auxiliary gas, the top end of the flow-guiding body 7 is preferably located at about the height of the lowermost auxiliary-gas supply orifice.

The separator shown in FIG. 3 is provided with a substantially conical funnel portion 8 at the upper end of the gas inlet duct 2, and the streamlined flow-guiding body 10 has a shape somewhat different from that according to FIG. 1.

The flow-guiding body may also be given a more elongated shape such as shown at 11 in FIG. 4. It is preferable to give the cross section of the funnel portion at the top of gas inlet pipe 2 a tulip-shaped, streamlined design as exemplified at 9 in FIG. 4. The separator according to FIG. 4 is further provided with additional inlet pipes 12, 18 for auxiliary gas which, like the inlet pipe 3, are directed tangentially and are downwardly inclined. While the three injection pipes 3, 12, 18 in FIG. 4 are shown above one another, they may also be peripherally distributed on the cylindrical wall of the separator 1, as is exemplified by the embodiments shown in FIGS. 5 to 8.

Figure 6:
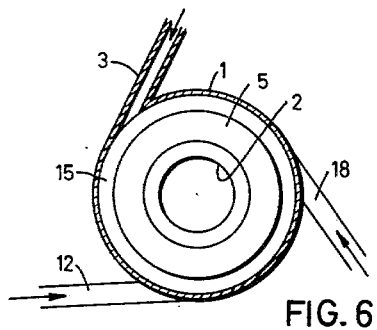
FIG. 6 is a top view of the same separator.

The dust-from-gas separator according to FIGS. 5 and 6 corresponds essentially to the one described above with reference to FIGS. 1, 2 and is provided with three lateral nozzle pipes 3, 12, and 18 for injection of auxiliary gas into the main flow coming from the gas inlet duct 2. Each of these injection pipes is downwardly inclined relative to the cylindrical enclosure 1 of the separator and, seen from the top according to FIG. 6, extends substantially tangentially with respect to the inner wall surface of the enclosure. The three pipes are uniformly distributed about the periphery of the cylindrical enclosure. The orifices are located on a helical line along the cylinder wall. Each orifice is of rounded and elongated shape, and care has been taken that the orifices do not protrude into the inner space of the enclosure but are substantially flush with the cylindrical inner wall.

Figure 7:
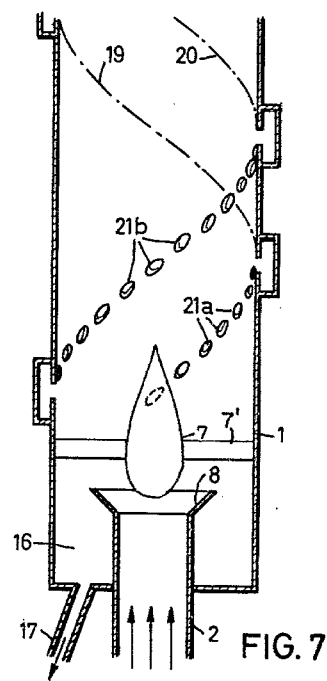
FIGS. 7 and 8 are sectional front views of two further modifications.

The above-mentioned features are also incorporated in the separator shown in FIG. 7 where a much larger number of individual nozzle orifices 21 are arranged on two helical lines 19 and 20. As also shown in FIG. 7, the orifices along one and the same helical line, or a given number of the latter orifices, communicate with one and the same manifold duct 21a or 21b which extends helically around the separator enclosure thus simultaneously supplying all appertaining orifices with auxiliary gas. The funnel opening 8 of the gas supply pipe 2 shown in FIG 7 corresponds to that according to FIG. 3.

Figure 8:
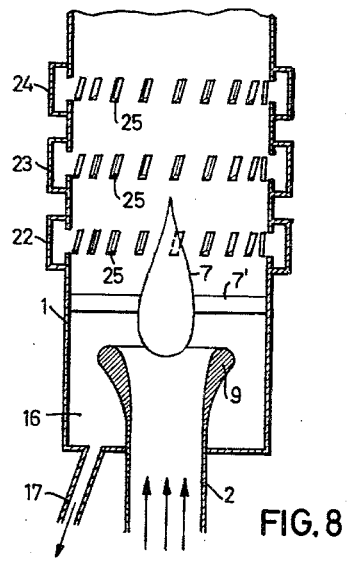

In the embodiment shown in FIG. 8, the separator enclosure is provided with three groups of nozzle orifices 25 each shaped as a narrow slot for better concentration of the auxiliary gas flow. The three groups are located on respective radial palnes axially spaced from each other, and each group communicates with its own manifold duct 22, 23 or 24 extending around the separator enclosure 1. The tulip-shaped funnel structure 9 shown in FIG. 8 corresponds to that of FIG. 4.

Figure 9:
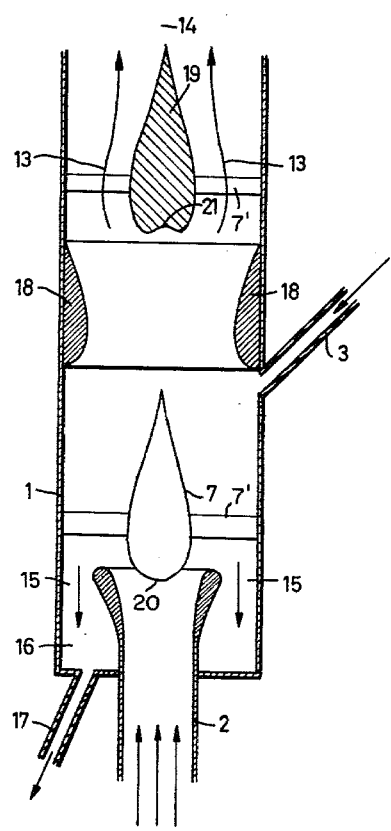
FIG. 9 shows still another separator by a vertical sectional view.

Such a tulip-shaped funnel structure is also part of the separator illustrated in FIG. 9. This separator, shown with a single lateral gas injection pipe 3 may, of course, also be equipped with a multiplicity of such pipes as explained above with reference to FIGS. 4 to 8. Mounted above the orifice of injection pipe 3, or above the highest orifice if a multiplicity of injection nozzles are used, is a ring-shaped body 18 with a streamlined inner contour that forms a constriction in the interior of the cylindrical enclosure 1. By suitably dimensioning this diaphragm or constriction, the error jet that may issue from the supply of auxiliary gas in the upward direction becomes deflected downwardly. This effect can be further improved by mounting above or within the constriction a flow-guiding body 19 (dobbas) of the same type as the above-described body 7. This body 19 may be downwardly rounded to convex shape 20 similar to the portion of dobbas 7 and is pointed in the upward direction, the body 19 being located substantially between the top opening of the enclosure 1 and the constriction formed by the ring 18. However as illustrated in FIG. 9, the bottom portion of the flow-guiding body 19 may also be given a concave profile, for example as shown by the full line at 21. It should be noted that the body 19 also produces a constriction of the flow cross section in the upper portion of the separator chamber. In some cases, therefore, the provision of such a streamlined body in the upper portion is sufficient without the insertion of the ring structure 18. In other cases the ring structure 18 or a similar construction alone is sufficient. However, both structures are also applicable conjointly in accordance with the illustrated embodiment.

Upon a study of this disclosure it will be obvious to those skilled in the art that our invention, described with particular reference to dust separation, is equally well applicable for the separation of liquid particles or for drying purposes in general, and that with respect to structural details it is amenable to various modifications and hence can be given embodiments other than particularly illustrated and described herein, without departing from the essential features of our invention and within the scope of the claims annexed hereto.

We claim:

1. A particle-from-gas separator comprising a cylindrical enclosure having an inlet for a particle-laden main flow of gas at its bottom, an annular space around said inlet for receiving separated particle material, and a clean gas outlet opening at the top; nozzle means for supplying an auxiliary gas flow, said nozzle means communicating with the interior of said enclosure and terminating at the inner wall surface of said enclosure and directed so as to have a flow direction approximately tangential to said wall and downwardly inclined at an acute angle to the cross-sectional plane of said enclosure for causing the auxiliary gas flow to excite particle-separating circulatory motion in the main flow of gas, said gas inlet comprising a tubular duct protruding from below into the interior of said container and terminating below said nozzle means in an upwardly widening funnel-shaped end portion whose largest diameter is smaller than the inner diameter of said container to form at the top of said particle-receiving annular space an annular gap narrower than said space, and particle discharge means extending downwardly away from said annular space, a streamlined and drop-shaped body axially mounted in said enclosure and having a bulging lower end located adjacent the top of said funnel portion and a pointed upper end adjacent said gas duct means for supplying the auxiliary gas flow.

2. A particle-from-gas separator comprising an elongated cylindrical enclosure having a substantially vertical axis when in operative position and having an opening at the top, said enclosure forming a whirling chamber whose diameter has substantially the same size along the vertical length of said enclosure up to said top opening, an inlet duct for supplying a particle-laden main flow of gas coaxially protruding upwardly into the interior of said enclosure and forming together therewith an annular particle-receiving space around said duct at the bottom of said enclosure, said duct having in said enclosure an upwardly widening funnel portion forming around its top periphery and together with said enclosure an annular gap through which said whirling chamber communicates with said space, particle-discharge conduit means extending downwardly away from said space, supply means for auxiliary gas, said supply means communicating with the interior of said enclosure above said funnel portion and terminating at the inner wall surface of said enclosure and directed so as to have a gas-flow direction substantially tangential to the inner wall surface of said enclosure and inclined downwardly for causing the flow of auxiliary gas to excite a particle separating whirling motion in the main gas flow, a streamlined and drop-shaped body axially mounted in said enclosure and having a bulging lower end located adjacent the top of said funnel portion and a pointed upper end adjacent said gas duct means for supplying the auxiliary gas flow.

3. A particle-from-gas separator comprising an elongated cylindrical enclosure having a substantially vertical axis when in operative position and forming a whirling chamber with a gas outlet opening at the top, the diameter of said chamber having substantially the same size as said opening, an inlet duct for supplying a particle-laden main flow of gas coaxially protruding upwardly into the interior of said enclosure and forming together therewith an annular particle-receiving space around said conduit at the bottom of said enclosure, said duct having in said enclosure an upwardly widening funnel portion forming around its top periphery an annular gap with said enclosure through which gap said whirling chamber communicates with said space, said funnel portion having a streamlined cross section generally of tulip shape whose radial thickness tapers downwardly, particle-discharge means extending downwardly away from said space, gas duct means for supplying an auxiliary flow of gas, said gas duct means communicating with the interior of said enclosure above said funnel portion and having a gas-flow direction substantially tangential to the inner wall surface of said enclosure and inclined downwardly for causing the auxiliary gas flow to excite a particle separating whirling motion in the main gas flow, a streamlined drop-shaped body axially mounted in said enclosure and having a bulging lower end located adjacent the top of said funnel portion and a pointed upper end adjacent said gas duct means for supplying the auxiliary gas flow.

4. A particle-from-gas separator comprising a cylindrical enclosure having a coaxial inlet for a particle-laden main flow of gas at its bottom, an annular space around said inlet for receiving separated particle material, and a coaxial clean-gas outlet opening at the top, a multiplicity of lateral nozzle means for injecting auxiliary gas into the main flow to excite particle-separating forces therein, said nozzle means being peripherally distributed on said enclosure and terminating at the inner wall surface of said enclosure and directed so as to have a gas-flow direction in a substantially tangential direction along the inner wall surface of said enclosure and downwardly inclined at an angle to the flow axis of the main gas flow, said gas inlet comprising a tubular structure protruding from below into the interior of said enclosure and terminating below said duct means in an upwardly widening funnel-shaped end portion whose largest diameter is smaller than the inner diameter of said container to form at the top of said particle-receiving space an annular gap narrower than said space, and particle discharge conduit means extending downwardly away from said annular space, a streamlined and drop-shaped body axially mounted in said enclosure and having a bulging lower end located adjacent the top of said funnel portion and a pointed upper end adjacent said gas duct means for supplying the auxiliary gas flow.

5. In a separator according to claim 4, said nozzle means being arranged on a plurality of circles vertically spaced from each other above said funnel portion.

6. In a separator according to claim 4, said nozzle means having respective nozzle orifices substantially flush with the inner wall surface of said cylindrical enclosure.

7. In a separator according to claim 4, said nozzle means comprising respective groups of nozzle orifices, each group having a distributor gas duct extending around said enclosure and communicating through the nozzle orifices of the group with the interior of said enclosure.

8. A particle-from-gas separator comprising an elongated cylindrical enclosure having a substantially vertical axis when in operative position and forming an upwardly open whirling chamber whose diameter has substantially the same size as the top opening, an inlet conduit for supplying a particle-laden main flow of gas coaxially protruding upwardly into the interior of said enclosure and forming together therewith an annular particle-receiving space around said conduit at the bottom of said enclosure, said conduit having in said enclosure an upwardly widening funnel portion forming around its top periphery an annular gap with said enclosure through which gap said whirling chamber communicates with said space, particle-discharge pipe means extending away from said space, a multiplicity of nozzle means for injecting auxiliary gas into the main flow to excite particle-separating forces therein, said nozzle means being peripherally distributed on said enclosure along helical lines above said funnel portion and terminating at the inner wall surface of said enclosure and directed so as to have a gas-flow direction in a substantially tangential direction along the inner wall surface of said enclosure and downwardly inclined at an angle to the flow axis of the main gas flow, a streamlined and drop-shaped body axially mounted in said enclosure and having a bulging lower end located adjacent the top of said funnel portion and a pointed upper end adjacent said gas duct means for supplying the auxiliary gas flow.

9. A particle-from-gas separator comprising an elongated cylindrical enclosure having a substantially vertical axis when in operative position, and having a coaxial top opening, said enclosure forming a whirling chamber whose diameter has substantially the same size as said top opening along the vertical length of said chamber, an inlet conduit for supplying a particle-laden main flow of gas coaxially protruding upwardly into the interior of said enclosure and forming together therewith an annular particle-receiving space around said conduit at the bottom of said enclosure, said conduit having in said enclosure an upwardly widening funnel portion forming around its top periphery an annular gap with said enclosure through which gap said whirling chamber communicates with said space, particle-discharge pipe means extending away from said space, a multiplicity of nozzle means for injecting auxiliary gas into the main flow to excite particle-separating forces therein, said nozzle means being peripherally distributed on said enclosure above said funnel portion and terminating at the inner wall surface of said enclosure and directed so as to have a gas-flow direction in a substantially tangential direction along the inner wall surface of said enclosure and downwardly inclined at an angle to the flow axis of the main gas flow, and a ring-shaped constriction disposed in said enclosure above the uppermost one of said nozzle means and below said top opening of said enclosure, a streamlined, rotationally symmetrical and drop-shaped body axially mounted in said enclosure and having a bulging lower end located adjacent the top of said constriction.

10. In a separator according to claim 9, said constriction comprising a ring structure having a rounded and streamlined inner contour.

11. A particle-from-gas separator comprising an elongated cylindrical enclosure having a substantially vertical axis when in operative position, and forming an upwardly open whirling chamber whose diameter has substantially the same size as the top opening along the entire height of said chamber, an inlet conduit for supplying a particle-laden main flow of gas coaxially protruding upwardly into the interior of said enclosure and forming together therewith an annular particle-receiving space around said conduit at the bottom of said enclosure, said conduit having in said enclosure an upwardly widening funnel portion forming around its tops periphery an annular gap with said enclosure through which gap said whirling chamber communicates with said space, said funnel portion having a streamlined cross section generally of tulip shape whose radial thickness tapers downwardly, particle-discharge conduit means extending downwardly away from said space, gas duct means for supplying an auxiliary flow of gas, said gas duct means communicating with the interior of said enclosure above said funnel portion and terminating at the inner wall surface of said enclosure and directed so as to have a gas-flow direction substantially tangential to the inner wall surface of said enclosure and inclined downwardly for causing the auxiliary gas flow to excite a particle separating whirling motion in the main gas flow, two drop-shaped streamlined bodies each having a rounded lower end and a substantially pointed upper end, one of said drop-shaped bodies being mounted axially between said funnel portion and said gas duct means, said other drop-shaped body being mounted axially between said gas duct means and said top opening of said enclosure.

References Cited by the Examiner

UNITED STATES PATENTS

| 434,042 | 8/90 | Crawford | 55—463 |
| 1,958,577 | 5/34 | Hirshfeld | 55—461 |
| 2,026,833 | 1/36 | Holland-Letz | 55—463 |
| 2,048,613 | 7/36 | McKee | 55—463 |
| 2,153,026 | 4/39 | Ringius | 55—459 |
| 2,358,497 | 9/44 | Egloff | 55—455 |
| 2,393,112 | 1/46 | Lincoln | 55—418 |
| 2,650,675 | 9/53 | Yellott | 55—83 |
| 2,763,886 | 9/56 | Brown et al. | 55—418 |

FOREIGN PATENTS

| 525,985 | 2/54 | Belgium. |
| 1,021,497 | 12/52 | France. |
| 713,670 | 8/54 | Great Britain. |
| 479,714 | 4/53 | Italy. |
| 51,995 | 2/42 | Netherlands. |

HARRY B. THORNTON, *Primary Examiner.*

HERBERT L. MARTIN, *Examiner.*